(12) United States Patent
Tsuchiya et al.

(10) Patent No.: US 11,890,532 B2
(45) Date of Patent: *Feb. 6, 2024

(54) SHOOTING GAME CONTROL METHOD AND GAME SYSTEM

(71) Applicant: GREE, INC., Tokyo (JP)

(72) Inventors: Yuichi Tsuchiya, Tokyo (JP); Norihiro Sawada, Tokyo (JP); Tadashi Nagano, Tokyo (JP); Takeshi Arakawa, Mitaka (JP)

(73) Assignee: GREE, INC., Tokyo (JP)

( * ) Notice: Subject to any disclaimer, the term of this patent is extended or adjusted under 35 U.S.C. 154(b) by 40 days.

This patent is subject to a terminal disclaimer.

(21) Appl. No.: 17/686,377

(22) Filed: Mar. 3, 2022

(65) Prior Publication Data

US 2022/0184490 A1 Jun. 16, 2022

Related U.S. Application Data

(63) Continuation of application No. 16/719,917, filed on Dec. 18, 2019, now Pat. No. 11,278,794, which is a (Continued)

(30) Foreign Application Priority Data

Feb. 26, 2013 (JP) ................................. 2013-035555
Jun. 24, 2013 (JP) ................................. 2013-131778

(51) Int. Cl.
*A63F 13/00* (2014.01)
*A63F 13/2145* (2014.01)
(Continued)

(52) U.S. Cl.
CPC ........ *A63F 13/2145* (2014.09); *A63F 13/426* (2014.09); *A63F 13/837* (2014.09)

(58) Field of Classification Search
CPC ... A63F 13/426; A63F 13/2145; A63F 13/837
(Continued)

(56) References Cited

U.S. PATENT DOCUMENTS 7,140,962 B2 11/2006 Okuda
7,489,306 B2 2/2009 Kolmykov-Zotov et al.
(Continued)

FOREIGN PATENT DOCUMENTS

JP 2010-17395 1/2010

OTHER PUBLICATIONS

Tampatec, "Top Android Game Apps on Nexus Tablet Review", published Oct. 24, 2012.
(Continued)

*Primary Examiner* — Michael A Cuff
(74) *Attorney, Agent, or Firm* — Oblon, McClelland, Maier & Neustadt, L.L.P.

(57) ABSTRACT

A shooting game control method, which is executed by a computer incorporated in a device including a display and a touch panel, includes accepting a touch operation on the touch panel; displaying a first frame indicative of a shooting effective range on the display in accordance with a position of the touch operation; accepting an instruction for an attack on an attack target in a state in which the first frame is displayed; determining whether the attack target in a game image displayed on the display is within the first frame or not, at a time point when the instruction for the attack has been accepted; and controlling the attack on the attack target in the game image in accordance with a result of the determining.

17 Claims, 4 Drawing Sheets

Related U.S. Application Data continuation of application No. 15/929,118, filed on Mar. 29, 2019, now Pat. No. 11,033,808, which is a continuation of application No. 15/711,131, filed on Sep. 21, 2017, now Pat. No. 10,286,302, which is a continuation of application No. 15/376,810, filed on Dec. 13, 2016, now Pat. No. 9,795,873, which is a continuation of application No. 14/186,496, filed on Feb. 21, 2014, now Pat. No. 9,561,436.

(51) Int. Cl.
*A63F 13/837* (2014.01)
*A63F 13/426* (2014.01)

(58) Field of Classification Search
USPC .......................................................... 463/2
See application file for complete search history.

(56) References Cited

U.S. PATENT DOCUMENTS

| | | | |
|---|---|---|---|
| 7,785,199 B2 | 8/2010 | Nishimura et al. | |
| 8,751,159 B2 | 6/2014 | Hall | |
| 8,961,307 B2 | 2/2015 | Akifusa et al. | |
| 9,149,720 B2 | 10/2015 | Sakurai | |
| 2004/0110560 A1 | 6/2004 | Aonuma | |
| 2005/0159223 A1 | 6/2005 | Tahara et al. | |
| 2006/0089570 A1 | 4/2006 | Mansour | |
| 2007/0024597 A1 | 2/2007 | Matsuoka | |
| 2007/0129990 A1 | 6/2007 | Tzruya | |
| 2007/0130292 A1* | 6/2007 | Tzruya | G06Q 30/0207 709/219 |
| 2008/0122792 A1 | 5/2008 | Izadi | |
| 2008/0309916 A1 | 12/2008 | Mok | |
| 2009/0247250 A1 | 10/2009 | Kato | |
| 2010/0130296 A1 | 5/2010 | Ackley | |
| 2011/0039618 A1 | 2/2011 | Ichiyanagi | |
| 2011/0092289 A1 | 4/2011 | Dagman et al. | |
| 2011/0173587 A1 | 7/2011 | Detwiller | |
| 2012/0214137 A1* | 8/2012 | Goree | F41A 17/063 434/19 |
| 2013/0009989 A1* | 1/2013 | Chen | G06F 3/0488 345/629 |
| 2013/0217498 A1 | 8/2013 | Wang | |
| 2013/0316823 A1 | 11/2013 | Peled et al. | |
| 2014/0110482 A1 | 4/2014 | Bay | |
| 2014/0319216 A1 | 10/2014 | Meinert | |
| 2014/0364180 A1 | 12/2014 | Olivar | |
| 2015/0362288 A1 | 12/2015 | Sammut | |

OTHER PUBLICATIONS

Defendant Supercell Oy's Motion to Dismiss, submitted May 16, 2019, in Case No. 2:19-cv-00070-JRG-RSP, 39 pages.
Notice of Compliance With Standing Order Regarding Motions Under 35 U.S.C. §101, submitted Jun. 4, 2019 in Case No. 2:19-cv-00070-JRG-RSP, 2 pages.
Exhibit 1, submitted Jun. 4, 2019 in Case No. 2:19-cv-00070-JRG-RSP, 7 pages.
Defendant *Supercell Oy's* Reply in Support of its Motion to Dismiss, filed Jun. 24, 2019, *Gree, Inc.* vs. *Supercell Oy*, US Civil Action No. 2:19-cv-00070-JRG-RSP, 16 pages.
Plantiff Gree, Inc.'s Sur-Reply to Defendent Supercell Oy's Reply in Support of its Motion to Dismiss, filed Jul. 1, 2019, *Gree, Inc.* vs. *Supercell Oy*, US Civil Action No. 2:19-cv-00070-JRG-RSP, 15 pages.
Defendant Supercell Oy's Motion to Dismiss, filed Aug. 2, 2019, *Gree, Inc.* vs. *Supercell Oy*, US Civil Action No. 2:19-cv-00172-JRG-RSP, 20 pages.
Gree, Inc.'s Opposition to Defendant Supercell Oy's Motion to Dismiss, filed Sep. 3, 2019, *Gree, Inc.* vs. *Supercell Oy*, US Case No. 2:19-cv-00172-JRG-RSP, 22 pages.
Petitioner's Reply to Patent Owner's Preliminary Response Pursuant to 37 C.F.R. §42.108(c); *Supercell Oy* (Petitioner) vs. *Gree, Inc.* (Patent Owner); Case No. 2020-00215; U.S. Pat. No. 9,795,873 B2; Mar. 31, 2020.
Petitioner's Reply to Patent Owner's Preliminary Response to Pursuant to 37 C.F.R. §42.108(c); *Supercell Oy* (Petitioner) vs. *Gree, Inc.* (Patent Owner); Case No. 2020-00310; U.S. Pat. No. 10,286,302 B2; Apr. 10, 2020.
Patent Owner's Sur-Reply to Petitioner's Reply to Owner's Preliminary Response; *Supercell Oy* (Petitioner) vs. *Gree, Inc.* (Patent Owner); Case IPR2020-00215; U.S. Pat. No. 9,795,873 B2; Apr. 14, 2020.
Patent Owner's Sur-Reply to Petitioner's Reply to Patent Owners Preliminary Response; *Supercell Oy* (Petitoner) vs. *Gree, Inc.* (Patent Owner); Case IPR2020-00310 U.S. Pat. No. 10,286,302 B2; Apr. 24, 2020.
Defendant Supercell Oy's Reply in Support of its Motion to Dismiss, filed Sep. 10, 2019, *Gree, Inc.* vs. *Supercell Oy*, US Civil Action No. 2:19-cv-00172-JRG-RSP, 15 pages.
Gree, Inc.'s Sur-Reply to Defendant Supercell Oy's Reply in Support of its Motion to Dismiss, filed Sep. 18, 2019, *Gree, Inc.* vs. *Supercell Oy*, US Case No. 2:19-cv-00172-JRG-RSP, 16 pages.
Defendant Supercell Oy's Invalidity Contentions and Disclosures Under Local Patent Rules 3-3 and 3-4. Civil Action No. 2:19-cv-00070-JRG-RSP.
Par-Anders Albinsson, et al; "High Precision Touch Screen Interaction". 2: 19-cv-00070-JRG-RSP.
Backbone Entertainment; Age of Empires: Age of Kings, Game and Manual. 2: 19-cv-00070-JRG-RSP.
Official Filing Receipt of U.S. Appl. No. 61/649,940 dated Jun. 11, 2012. 2: 19-cv-00070-JRG-RSP.
Supercell; Exhibit D-1; Advance Wars: Dual Strike ("Advance Wars"). 2: 19-cv-00070-JRG-RSP.
Supercell; Exhibit D-2; Age of Empires: Age of Kings by Backbone Entertainment ("Age of EmpiresDS"). 2: 19-cv-00070-JRG-RSP.
Supercell; Exhibit D-3; High Precision Touch Screen Interaction by Par-Anders Abinsson and Shumin Zhai ("Albinsson&Zhai"). 2: 19-cv-00070-JRG-RSP.
Supercell; Exhibit D-4; Angry Birds: Star Wars ("Angry Birds"). 2: 19-cv-00070-JRG-RSP.
Supercell; Exhibit D-5; Call of Mini Sniper by Shengwei Network Technology Co., Ltd. ("Call of Mini"). 2: 19-cv-00070-JRG-RSP.
Supercell; Exhibit D-6; US Patent. Pub. No. 2011/0092289 ("Dagman"). 2: 19-cv-00070-JRG-RSP.
Supercell; Exhibit D-7; Final Fantasy Tactics A2: Grimoire of the Rift ("FFTA2"). 2: 19-cv-00070-JRG-RSP.
Supercell; Exhibit D-8; U.S. Pat. No. 9,206025 ("Hall"). 2: 19-cv-00070-JRG-RSP.
Supercell; Exhibit D-9; U.S. Pat. No. 9,266,025 ("Hall") and US Patent Pub. No. 2011/0173587 ("Detwiller"). 2: 19-cv-00070-JRG-RSP.
Defendant *Supercell Oy'S* Preliminary Ineligibility Contentions, Civil Action No. 2:19-cv-00172-JRG-RSP., Nov. 13, 2019.
Petition for Inter Partes Review of U.S. Pat. No. 9,795,873; *Upercell Oy* , Petitioner vs. *Gree, Inc.*, Patent Owner. Dec. 4, 2019.
Declaration of Jose P. Zagal., Ph.D. in Support of Petitions for Inter Partes Reviews of U.S. Pat. Nos. 9,795,873 & 10,286,302. Supercell Exhibit 1007. Nov. 18, 2019.
José P. Zagal; Entertainment Arts & Engineering University of Utah; Curriculum Vitae, Supercell Exhibit 1008. Jul. 2019.
Pär-Anders Albinsson et al.; High Precision Touch Screen Interaction, Supercell, Exhibit 1009.
Nintendo Unveiling a New Portable. Online article by Steven Kent, Special for USA Today. Posted May 11, 2004. Supercell Exhibit 1010.
DSi XL Hits US and EU. Online article by Tar Thorsen, Nov. 2, 2019. Supercell Exhibit 1011.
Nintendo DS: The First Five Years. Games Radar. Online article by Brett Elston, Nov. 21, 2009. Supercell Exhibit 1012.
Could Nintendo's Game Finally Open Up the DS to First-Person Shooters?, Metroid Prime Hunters. Online article by Craig Harris, Mar. 21, 2006. Supercell Exhibit 1013.

(56) References Cited

OTHER PUBLICATIONS

Apple Unveils iPhone. Retrieved from www.macworld.com. Online article by Matthew Honan, Jan. 9, 2007. Supercell Exhibit 1014.
Apple's App Store Launches With More than 500 apps. Online article by AppleInsider Staff, Jul. 10, 2018. Supercell Exhibit 1015.
Apple's App Store Downloads Top 10 Billion; Newsroom, Press Release, Jan. 22, 2011. Supercell Exhibit 1016.
Loutfouz Zaman, et al., Touchscreens vs. Traditional Controllers in Handheld Gaming. Supercell Exhibit 1017.
Defendant Supercell Oy's Invalidity Contentions and Disclosures Under Local Patent Rules 3-3 and 3-4, filed Dec. 6, 2019, *Gree, Inc.* vs. *Supercell Oy*, US Case No. 2:19-cv-00172-JRG-RSP, 21 pages.
Supercell; Exhibit A-1; Advance Wars: Dual Strike ("Advanced Wars"). 2:19-cv-00172-JRG-RSP.
Supercell; Exhibit A-2; Age of Empires: Age of Kings by Backbone Entertainment ("Age of Empires DS"). 2:19-cv-00172-JRG-RSP.
Supercell; Exhibit A-3; "High Precision Touch Screen Interaction" by Pär-Anders Albinsson and Shumin Zhai (Albinsson & Zhai). 2:19-cv-00172-JRG-RSP.
Supercell; Exhibit A-4; Angry Birds: Star Wars ("Angry Birds"). 2:19-cv-00172-JRG-RSP, 32 pages.
Supercell; Exhibit A-5; Call of Mini Sniper by Shengwei Network Technology Co., Ltd ("Call of Mini"). 2:19-cv-00172-JRG-RSP.
Exhibit; Exhibit A-6; U.S. Patent Pub. No. 2011/0092289 to Dagman, et al. ("Dagmen"). 2:19-cv-00172-JRG-RSP.
Supercell; Exhibit A-7; Final Fantasy Tactics A2: Grimoire of the Ritt ("FFTA2"). 2:19-cv-00172-JRG-RSP.
Supercell; Exhibit A-8; Gesundheitl by Revolutionary Concepts ("Gesundheit"). 2:19-cv-00172-JRG-RSP.
Supercell; Exhibit A-9; U.S. Pat. No. 8,751,159 to Hall ("Hall"). 2:19-cv-00172-JRG-RSP.
Supercell; Exhibit A-10; U.S. Pat. No. 8,751,159 to Hall ("Hall") and U.S. Patent Pub. No. 2011/0173587 to Detwiller ("Detwiller"). 2:19-cv-00172-JRG-RSP.
Supercell; Exhibit A-11; U.S. Pat. No. 8,751,159 to Hall ("Hall") and U.S. Pat. No. 7,489,306 to Kolmykov-Zotov, et al. ("Kolmykov-Zotov"). 2:19-cv-00172-JRG-RSP.
Supercell; Exhibit A-12; U.S. Pat. No. 7,489,306 to Kolmykov-Zotov, et al. ("Kolmykov-Zotov"). 2:19-cv-00172-JRG-RSP.
Supercell; Exhibit A-13; Modern Combat: Sandstrom by Gameloft ("Modern Combat Sandstorm"). 2:19-cv-00172-JRG-RSP.
Supercell; Exhibit A-14; U.S. Pat. No. 7,785,199 to Nishimura, et al. ("Nishimura"). 2:19-cv-00172-JRG-RSP.
Supercell; Exhibit A-15; U.S. Patent Pub. No. 2013/0316823 to Peled, et al. ("Peled"). 2:19-cv-00172-JRG-RSP.
Supercell, Exhibit A-15, U.S. Pat. No. 9,149,720 to Sakurai, et al. ("Sakurai"). 2:19-cv-00172-JRG-RSP.
Supercell; Exhibit A-17; Snow Vs. Sniper Online by Com2uS Corp. ("Sniper vs. Sniper"). 2:19-cv-00172-JRG-RSP.
Supercell; Exhibit A-18; Warhammer 40,000: Squad Command by RedLynx ("Warhammer40k"). 2:19-cv-00172-JRG-RSP.
Supercell; Exhibit A-19; Zombie Gunship by Limbic Software ("Zombie Gunship").2:19-cv-00172-JRG-RSP.
Advance Wars Dual Strike: Instruction Booklet; Nintendo DS; Jun. 13, 2005 Nintendo/Intelligent Systems, 21 pages.
Albinsson P.-A., et al., "High Precision Touch Screen Interaction", CHI, Apr. 5-10, 2003, 8 pages.
Final Fantasy Tactics A2: Grimoire of the Rift; Manual and Nintendo DS Game, Jun. 24, 2008, Nintendo, 36 pages.
Savage, J., "IOS Central (/Column/IOSCentral/)", Macworld, Dec. 15, 2009, 2 pages.
Call of Mini™ Sniper of the App Store, Shengwei Network Technology Co., Retrieved from the Internet: https://apps.apple.com/us/app/call-of-mini-sniper/id494829360, Apple Inc., Mar. 15, 2012, 2 pages.
Gallegos, A., Gesundheitl (iOS) Review, Gesundheitl Game, Revolutionary Concepts, Retrieved from the Internet: https://www.ign.com/articles/2011/08/11/gesundtheit-ios-review, Aug. 3, 2011, pp. 1-9.

Warhammer 40,000: Dawn of War—Soulstorm, Retrieved from the Internet: https://web.archive.org/web/20121113155947/http://www.metacrilic.com/game/pc/warhammer-40000-dawn-of-war-soulstorm/details, Nov. 13, 2012, 2 pages.
Warhammer 40,000: Squad Command, Wikipedia, Retrieved from the Internet: http://en.wikipedia.org/wiki/Warhammer_40,000:_Squad_Command, Feb. 9, 2009, 3 pages.
Warhammer 40,000: Squad Command, Wikipedia, Retrieved from the Internet: http://en.wikipedia.org/wiki/Warhammer_40,000:_Squad_Command, Feb. 5, 2010, 2 pages.
Warhammer 40,000: Squad Command, Wikipedia, Retrieved from the Internet: http://en.wikipedia.org/windex.php?title=Warhammer_40,000:_Squad_Command&oldid=449432567, Sep. 10, 2021, 2 pages.
Warhammer 40,000: Squad Command, Wikipedia, Retrieved from the Internet: http://en.wikipedia.org/windex.php?title=Warhammer_40,000:_Squad_Command&oldid=449432567, Sep. 10, 2011, 2 pages.
Warhammer 40,000: Squad Command, Wikipedia, Retrieved from the Internet: http://en.wikipedia.org/wiki/Warhammer_40%2C000:_Squad_Command, Oct. 29, 2007, 2 pages.
Office Action dated Sep. 3, 2020 in cormsponding U.S. Appl. No. 15/929,118.
Defendant's Objection to Report and Recommendation Denying Defendant's Motion to Dismiss, filed Jan. 21, 2020, *Gree, Inc.* vs. *Supercell Oy*, US Case No. 2:19-cv-00172-JRG-RSP, 8 pages.
Report and Recommendation, filed Jan. 5, 2020, *Gree, Inc.* vs. *Supercell Oy*, U.S. Case No. 2:19-cv-00172-JRG-RSP, 8 pages.
Report and Recommendation, filed Jan. 21, 2020, *Gree, Inc.*, vs. *Supercell Oy*, US Case No. 2:19-cv-00172-JRG-RSP, 16 pages.
Decision Denying Institution of Inter Partes Review 35 U.S.C. § 314, 37 C.F.R. § 42.4; *Supercell Oy*, Petitioner vs. *Gree, Inc.*, Patent Owner; IPR2020-00215/U.S. Pat. No. 9,795,873 B2; Jun. 10, 2020; Paper No. 10; 20 pages.
Decision Denying Institution of Inter Partes Review 35 U.S.C. § 314, 37 C.F.R. § 42.4; *Supercell Oy*, Petitioner vs. *Gree, Inc.*, Patent Owner; IPR2020-00310/U.S. Pat. No. 10,286,302 B2; Jun. 18, 2020; Paper No. 13; 21 pages.
Defendant Supercell Oy's Motion for Summary Judgment of Invalidity for Failure to Claim Patent-Eligible Subject Matter Under 35 U.S.C. § 101; *Gree, Inc.*, Plaintiff vs. *Supercell Oy* Defendant; Civil Action No. 2:19-cv-00172-JRG-RSP; Document 219; Filed Jun. 10, 2020; 159 pages.
Plaintiff Gree, Inc.'S Opposition to Defendant Supercell Motion for Summary Judgment of Invalidity for Failure to Claim Patent-Eligible Subject Matter Under 35 U.S.C. §101; *Gree, Inc.*, Plaintiff vs. *Supercell Oy*, Defendant, Case No. 2:19-cv-00172-JRG-RSP; Document 244; Filed Jun. 22, 2020; 30 pages.
Defendant Supercell Oy's Reply in Support of Motion for Summary Judgment of Invalidity for Failure to Claim Patent-Eligible Subject Matter Under 35 U.S.C. § 101; *Gree, Inc.*, Plaintiff vs. *Supercell Oy*, Defendant; Civil Action No. 2:19-cv-00172-JRG-RSP; Document 291; Filed Jul. 2, 2020; 8 pages.
Plaintiff Gree, Inc.'s Sur-Reply in Opposition to Supercell'S Motion for Summary Judgment of Invalidity for Failure to Claim Patent-Eligible Subject Matter Under 35 U.S.C. §101; *Gree, Inc.*, Plaintiff vs. *Supercell Oy*, Defendant, Case No. 2:19-cv-00172-JRG-RSP; Document 317; Filed Jul. 8, 2020, 9 pages.
Defendant Supercell Oy's Motion for Summary Judgment of Invalidity of U.S. Pat. No. 9,795,813 Under 35 U.S.C. § 102 *Gree, Inc.*, Plaintiff vs. *Supercell Oy*, Defendant; Civil Action No. 2:19-cv-00172-JRG-RSP; Document 222; Filed Jun. 12, 2020; 81 pages.
Gree, Inc.'S Opposition to Defendant's Motion for Summary Judgment of Invalidity of U.S. Pat. No. 9,795,873 Under 35 U.S.C. § 102; *Gree, Inc.*, Plaintiff vs. *Supercell Oy*, Defendant; Case No. 2:19-cv-00172-JRG-RSP; Document 230; Filed Jun. 22, 2020; 90 pages.
Defendant Supercell Oy'S Reply in Support of Motion for Summary Judgment of Invalidity of U.S. Pat. No. 9,795,873 Under 35 U.S.C. § 102 [DKT 206]; *Gree, Inc.*, Plaintiff vs. *Supercell Oy*, Defendant; Civil Action No. 2:19-cv-00172-JRG-RSP; Document 270; Filed Jun. 29, 2020; 94 pages.

(56) References Cited

OTHER PUBLICATIONS

Plaintiff Gree, Inc.'s Sur-Reply in Opposition to Supercell's Motion for Summary Judgment of Invalidity of U.S. Pat. No. 9,795,873 Under 35 U.S.C. § 102 *Gree, Inc.*, Plaintiff vs. *Supercell Oy*, Defendant; Case No. 2:19-cv-00172-JRG-RSP; Document 306; Filed Jul. 7, 2020; 7 pages.
Report and Recommendation, *Gree, Inc.*, Plaintiff vs. *Supercell Oy*, Defendant; Case No. 2:19-cv-00172-JRG-RSP; Document 325; Filed Jul. 9, 2020; 7 pages.
Gree, Inc.'S Response to Defendant Supercell Oy's Objection to Report and Recommendation Denying Defendant's Motion to Dismiss; *Gree, Inc.* vs. *Supercell Oy*; Case No. 2:19-cv-00172-JRG-RSP; filed Feb. 4, 2020; 9 pages.
Gree, Inc.'s Response to Defendant Supercell Oy's Objection to Report and Recommendation Denying Defendant's Motion to Dismiss; *Gree, Inc.* vs. *Supercell Oy*; Case No. 2:19-cv-00172-JRG-RSP; filed Feb. 18, 2020; 9 pages.
Patent Owner'S Preliminary Response Pursuant to 37 C.F.R. § 42.107; *Supercell Oy* vs. *Gree, Inc.*; Case IPR2020-00215; U.S. Pat. No. 9,795,873 B2; Mar. 10, 2020; 28 pages.
Patent Owner's Preliminary Response Pursuant to 37 C.F.R. § 42.107; *Supercell Oy* vs. *Gree, Inc.*; Case IPR2020-00310; U.S. Pat. No. 10,266,302 B2; Mar. 23, 2020; 32 pages.
Office Action dated Mar. 16, 2020 in corresponding U.S. Appl. No. 15/929,118.
Expert Report of José Zagal; *Gree, Inc.*, Plaintiff vs. *Supercell Oy*, Defendant; Civil Action No. 2:19-cv-00070-JRG-RSP; Executed May 4, 2020; 500 pages.
Rebuttal Expert Report of Dr. Rober Alk, D.Sc.Regarding Validity of U.S. Pat. Nos. 9,604,137; 9,956,481; 9,774,655; and U.S. Pat. No. 7,795,873; *Gree, Inc.*, Plaintiff vs *Supercell Oy*, Defendant; Case No. 2:19-cv-00070-JRG-RSP; Executed May 26, 2020; 232 pages.
"Nintendo unveiling a new portable" by Steven Kent; usatoday.com; Posted May 11, 2004; URL: usatoday30.usatoday.com/life/lifestyle/2004-05-11-nintendo-ds_x.htm; Retrieved Jul. 11, 2019; Supercell PA 00009349-9350; 2 pages.
Article by Tor Thorsen; Gamespot; Posted on Nov. 2, 2009; URL: https://www.gamespot.com/articles/dsi-xl-hits-us-and-eu-g_1-2010-ds-sales-top-113-million/1100-6236345/; Supercell PA 00009354-9357; 4 pages.
"Nintendo DS: The first five years"; by Brett Elston; Games Radar +; Posted Nov. 21, 2009; URL: https://www.gamesradar.com/nintendo-ds-the-first-five-years/; Retrieved Jul. 11, 2019; Supercell PA 00009361-9399; 39 pages.
"Metroid Prime Hunters"; by Craig Harris; Metroid Prime Hunters—IGN; Posted Mar. 21, 2006; URL: https://www.ign.com/articles/2006/03/21/metroid-primo-hunters; Retrieved Jul. 11, 2019; Supercell PA 00009400-9406; 7 pages.
"Apple unveils uiPhone"; by Mathew Honan; Posted Jan. 9, 2007; URL: https://www.macworld.com/article/1054769/iphone.html; Supercell PA 00009407-9408; 2 pages.
"Apple's App Store launches with more than 500 apps"; by AppleInsider Staff; Posted Jul. 10, 2008; URL: https://appleinsider.com/articles/08/07/10/apples_app_store_launches_with_more_than_500_apps; Retrieved Jul. 11, 2019; Supercell PA 00009409-9410; 2 pages.
"Apple'App Store Downloads Top 10 Bilion"; Press Release; apple.com; Posted Jan. 22, 2011; URL: https://www.apple.com/newsroom/2011/01/22Apples-App-Store-Downloads-Top-10-Billion/; Retrieved Jul. 11, 2019; Supercell PA 00009411-9412; 2 pages.
"Gameloft's Modern Combat: Sandstorm Raises the Bar of iPhone Gaming"; by Eli Hodapp; TouchArcade; Posted Oct. 7, 2009; URL: https://toucharcade.com/2009/09/03/gamelofts-modern-combat-sandsto1m-raises-the-bar-of-iphone-gaming/; Retrieved Apr. 30, 2020; Supercell PA 00009425-9433; 9 pages.
Tuomas Hynninen; "First-Person Shooter Controls on Touchscreen Devices: a Heuristic Evaluation of Three Games on the iPod Touch"; University of Tampere; Department of Computer Sciences (Interactive Technology); M.Sc. Thesis, 64 pages, 4 index pages, Nov. 2012; Supercell PA 00009434-9501; 68 pages.
"Advance Wars Dual Strike"; Instruction Booklet; Nintendo DS; Supercell PA 00009502-9522; 21 pages.
"Metroid Prime Hunters"; Instruction Booklet; Nintendo DS; Supercell PA 00009523-9554; 32 pages.
"Modern Combat: Sandstorm"; by Jon Jordan; Pocket Gamer; Posted Sep. 8, 2009; URL: https://www.pocketgamer.com/articles/015411/modern-comvat-sandstorm/; Retrieved Apr. 30, 2020; Supercell PA 00009555-9564; 10 pages.
"Modern Combat: Sandstorm Review"; by Mark Bozon; IGN; Posted Sep. 10, 2009; URL: https://www.ign/com/aiticles/2009/09/10/modern-combat-sandstorm-review; Retrieved Apr. 30, 2020; Supercell PA 00009565-9570; 6 pages.
"Sniper Vs Sniper for iPhone"; by James Savage; MacWorld; IOS Central; Posted Dec. 15, 2009; URL: https://www.macworld.com/article/1145079/sniperiphonereview.html; Retrieved Apr. 30, 2020; Supercell PA 00009605-9611; 7 pages.
"Sniper vs. Sniper: Online"; by Keith Andrew; Pocket Gamer, Posted Nov. 9, 2009; URL: https://www.pocketgamer.com/articles/016627/sniper-vs-sniper-online/; Retrieved Apr. 30, 2020; Supercell PA 00009612-9618; 7 pages.
"Stability of Control Systems with Time Delay"; Touch Display—A Novel Input/Output Device for Computers; "Online Digital Prediction and Control of the Output of a Linear Time-Varying System"; Supercell PA 00009628-9629; 2 pages.
E.A. Johnson; "Touch Displays: A Programmed Man-Machine Interface"; Ergonomics; DOI: 10.1080/00140136708930868; Published Apr. 25, 2007; Supercell PA 00009630-9637; 8 pages.
E.A. Johnson; "Touch Displays"; U.S. Pat. No. 3,482,241; Published Dec. 2, 1969; Supercell PA 00009649-9655; 7 pages.
"Warharnmer 40,000:Squad Command"; DS Reviews; Metacritic; Posted Dec. 17, 2007; URL: https://www.metacritic.com/game/ds/warhammer-40000-squad-co1mnand; Retrieved Apr. 30, 2020; Supercell PA 00009656-9659; 4 pages.
"Sniper vs. Sniper: Online—Realtime Multiplayer Sniper Battles"; by Eli Hodaap; TouchArcard; Posted Nov. 1, 2009; URL: https://toucharcade.com/2009/10/22/sniper-vs-sniper-online-realtime-multiplayer-sniper-battles/; Retrieved Apr. 30, 2020; Supercell PA 00009688-9698, 11 pages.
IGN—YouTube Profile; Screen Capture; URL: https://www.youtube.com/user/IGNentertainment/about; Retrieved May 1, 2020; Supercell PA 00009946; 1 page.
Jaxon Carroll; YouTube Profile; Screen Capture; URL: https://www.youtube.com/user/AppConnoisseur/about; Retrieved May 1, 2020; Supercell PA 00009947; 1 page.
"Modern Combat: Sandstorm"; Fandom; URL: https://moderncombat.fandom/com/wiki/Modern_Combat:_Sanstorm; Retrieved May 1, 2020; Supercell PA 00009949-9956; 8 pages.
TouchGameplay; YouTube Profile; Screen Capture; URL: URL: https://www.youtube.com/user/touchgameplay/about; Retrieved May 1, 2020; Supercell PA 00009977; 1 page.
"Angry Birds Star Wars—Obi Wan Kenobi Black Bird Gameplay I WikiGameGuides"; WikiGameGuides YouTube Profile; Screen Capture; Posted Nov. 8, 2012; URL: https://www.youtube.com/watch?v=QkBhNyo1u5U; Supercell PA 00010296-10297; 2 pages.
"Warhammer 40,000: Squad Command Review"; by Brett Todd; GameSpot; Posted Nov. 21, 2007; URL: https://www.ign.com/games/warhammer-40k-squad-command; Retrieved May 4, 2020; Supercell PA 00010425-10429; 5 pages.
"Nintendo DS "Touching is Good" Ads"; TheMisterManGuy YouTube Profile; Screen Capture; Posted and Updated Apr. 3, 2018; URL: https://www.youtube.com/playlist?list=PLVGYVTOyUWXHE6yRzhDEww6Z_zZIC6s7; Retrieved May 4, 2020; Supercell PA 00010450-10452; 3 pages.
"THQ Announces Warhammer® 40,000: Squad Command [TM] for the Nintendo SS[TM] and PSP® System; Critically Acclaimed Warhammer 40,000 Franchise to Make Handheld Debut"; Business Wire, Inc.; Published Jun. 19, 2007; Supercell PA 00010472-10474; 3 pages.
Metroid Prime Hunters US Commercial (Version 2); Metroid Database YouTube Profile; Screen Capture; Pasted Apr. 6, 2008; Supercell PA 00010475-10476; 2 pages.

(56) References Cited

OTHER PUBLICATIONS

"Trial Statistics: Appeal and Interference Statistics"; Statistics USPTO; URL: https://www.uspto.gov/patents-application-process/patent-trial-and-appeal-board/statistics; Retrieved May 4, 2020; Supercell PA 00010489-10490; 2 pages.

"Trial Statistics IPR, PGR, CBM"; Patent Trial and Appeal Board; USPTO; Oct. 2019; Supercell PA 00010491-10501; 11 pages.

"Guardians of Haven Zombie War Walkthrough YouTube Profile; Part 1—Shooter Mission 1-6 (iOS Android)"; MobileGamesDaily YouTube Profile; Posted Jul. 8, 2017; Screen Capture; URL: https://www.youtube.com/watch?v=LoXfPTH1uxA; Retrieved Mar. 24, 2020; Supercell PA 00010579-10583; 5 pages.

"Guardians of Haven: Zombie War Android iOS Gameplay"; Igor Mitrovic YouTube Profile; Posted Jul. 6, 2017; Screen Capture; URL: https://www.youtube.com/watch?v=ODgvOwGWHeA; Retrieved Mar. 24, 2020; Supercell PA 00010584-10588; 5 pages.

Robert Hall; "Augmented Reality Gaming via Geographic Messaging"; U.S. Pat. No. 9,266,025; Published Feb. 23, 2016; Supercell PA 00010671-10707; 37 pages.

JustAnotherDude09 Appendix, Iphone version of "Call of Mini Sniper", youtube.com/watch?v=QybkX5Re-sk, Jul. 3, 2012 (Year: 2012).

Supercell, Exhibit D-10; U.S. Pat. No. 7,489,306 ("Kolmykev-Zotov"). 2: 19-cv-00070-JRG-RSR.

Supercell; Exhibit D-11, Modern Combat: Sandstorm by Gameloft ("Modern Combat Sandstorm"). 2: 19-cv-00070-JRG-RSR.

Supercell; Exhibit D-12, U.S. Pat. No. 7,785,199 ("Nishimura"). 2: 19-cv-0 70-JRG-RSP.

Supercell, Exhibit D-13; U.S. Pat. No. 7,785,190 ("Nishimura") and US Patent Pub. No. 2011/0173587 ("Detwiller"). 2: 19-cv-00070-JRG-RSP.

Supercell; Exhibit D-14; US Patent Pub. No. 2013/0316823 ("Peled"). 2: 19-cv-00070-JRG-RSR.

Supercell, Exhibit D-15; U.S. Pat. No. 9,149,720 ("Sakurai"). 2: 19-cv-00070-JRG-RSP.

Supercell; Exhibit D-16; Sniper Vs. Sniper: Online by Com2uS Corp. ("Sniper vs. Sniper"). 2: 19-cv-00070-JRG-RSP.

Supercell; Exhibit D-17; Warhamrner 40000: Squad Command by Rectlynx ("Warhammer40k"). 2: 19-cv-00070-JRG-RSP.

\* cited by examiner

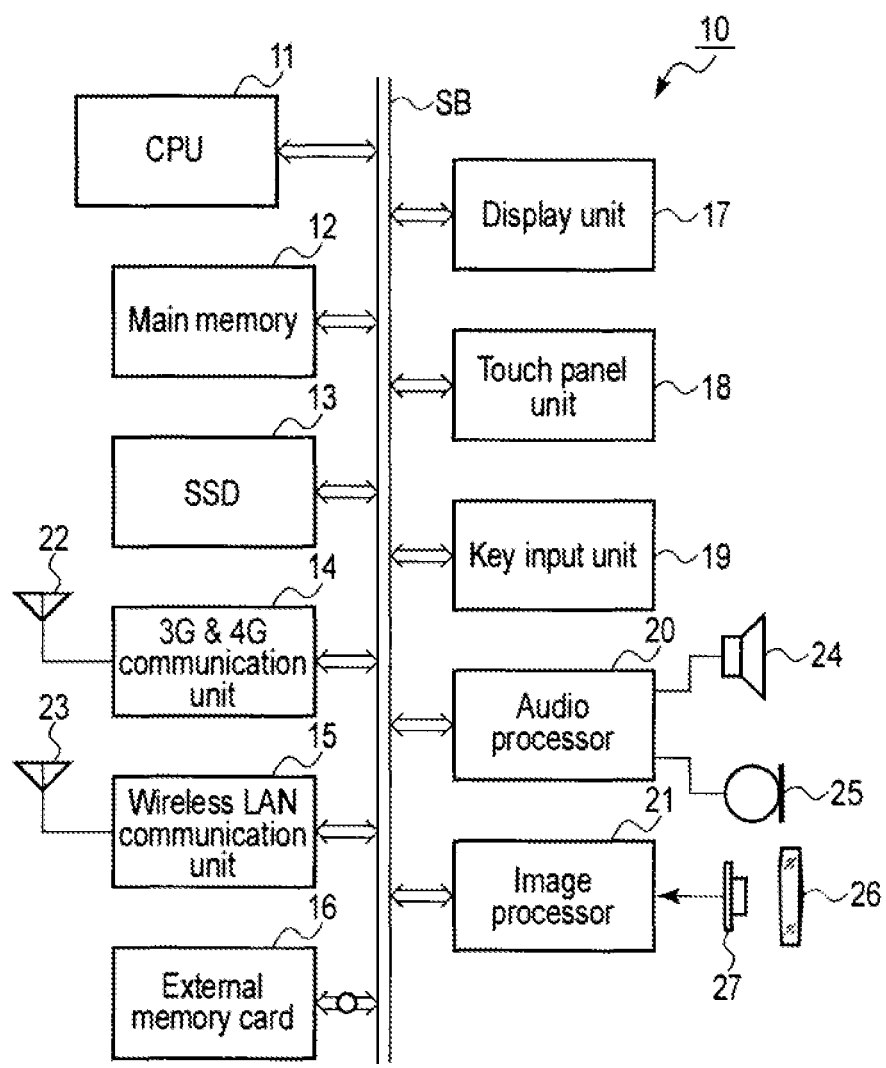
F I G. 1

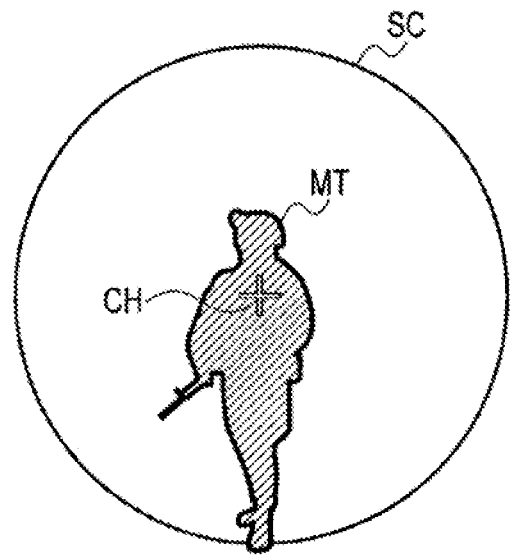
F I G. 3
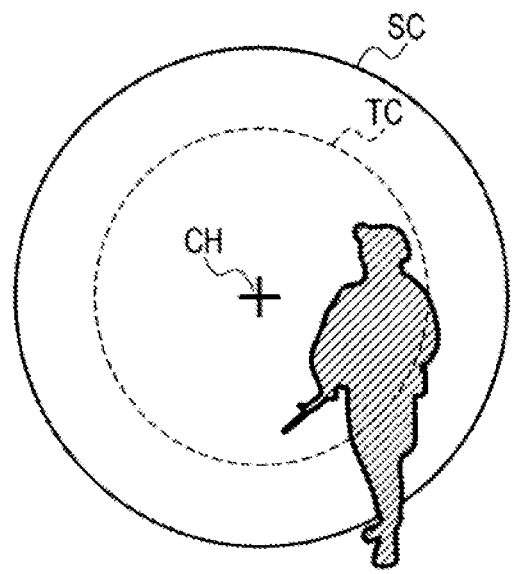
F I G. 4

SHOOTING GAME CONTROL METHOD AND GAME SYSTEM

CROSS-REFERENCE TO RELATED APPLICATIONS

This application is a continuation of U.S. application Ser. No. 16/719,917, filed Dec. 18, 2019, which is a continuation application of U.S. application Ser. No. 15/929,118, filed Mar. 29, 2019, (now U.S. Pat. No. 11,033,808), which is a continuation application of U.S. application Ser. No. 15/711,131, filed Sep. 21, 2017, (now U.S. Pat. No. 10,286,302), which is a continuation application which claims the benefit of priority under 35 U.S.C. § 120 of U.S. application Ser. No. 15/376,810, filed Dec. 13, 2016, (now U.S. Pat. No. 9,795,873), which is a continuation of U.S. application Ser. No. 14/186,496, filed Feb. 21, 2014, (now U.S. Pat. No. 9,561,436), which is based upon and claims the benefit of priority from Japanese Patent Applications No. 2013-035555, filed on Feb. 26, 2013 and No. 2013-131778, filed on Jun. 24, 2013, the entire contents of which are incorporated herein by reference.

BACKGROUND OF THE INVENTION

1. Field of the Invention

The present invention relates to a shooting game control method and a game system, which are suited to a device including a touch-panel-type display screen, such as a smartphone.

2. Description of the Related Art

Conventionally, there has been thought a technique wherein, in order to realize a game with high operability with use of a touch panel, if a touch panel is slid-operated so as to draw a locus surrounding an enemy character on a display screen, the enemy character surrounded by the locus is automatically registered as a lock-on target, and a shooting action aiming at the enemy character of the lock-on target is executed in accordance with a subsequent tap operation (for example, Patent document 1).

CITATION LIST

Patent Literature

Patent document 1: Jpn. Pat. Appln. KOKAI Publication No. 2010-017395

BRIEF DESCRIPTION OF THE DRAWINGS

In the technique disclosed in Patent document 1, in order to pinpoint an enemy character, an operation of "drawing a locus surrounding an enemy character" is executed. This operation realizes an easy-to-understand operability which is unique to the game using the touch panel, but this operation is unnatural in a game simulating a real shooting.

Specifically, in a game simulating a real shooting, for example, in a game simulating a long-distance shooting, for example, it appears more natural to adopt such an operation system that a button operation or the like, which corresponds to a trigger of a sniper's rifle, is executed in a state in which an enemy character has been captured at the center of the view field of the scope of the sniper's rifle by using the scope of the sniper's rifle, and thereby a bullet hits the enemy character.

In the case where this kind of game with operability simulating a real shooting is realized by a device with a limited display area, such as a smartphone, a concrete operation may become such that, for example, an enemy character is found out from the screen, the image of the enemy character is enlarged, an arbitrary shooting point is specified, and shooting is actually executed. Specifically, in some cases, a game, which is realized by a device with a limited display area, tends to make an overall operation complex, and a speedy game development may be hindered.

On the other hand, there are many shooting games with an auto-aiming function of instantaneously and automatically aiming at a nearby enemy character by performing a predetermined key operation. In particular, in a game in which many enemy characters appear and the numbers of successive shootings of enemy characters are contested, the auto-aiming function is effective, but it is difficult to express a weighting or the like of scores based on a difference in shooting position.

The object of the present invention is to provide a shooting game control method and a game system, which can achieve both precise shooting and speedy game development by a simple and easy-to-understand operation.

In general, according to one embodiment, a shooting game control method, which is executed by a computer incorporated in a device including a display configured to display a game image and a touch panel module provided integral with the display, includes accepting a touch operation on the touch panel module; displaying a first frame indicative of a shooting effective range on the display in accordance with a position of the touch operation; accepting an instruction for an attack on an attack target in a state in which the first frame is displayed; determining whether the attack target in a game image displayed on the display is within the first frame or not, at a time point when the operation for the attack has been accepted; and controlling the attack on the attack target in the game image in accordance with a result of the determining.

According to the present invention, it is possible to achieve both precise shooting and speedy game development by a simple and easy-to-understand operation.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating a functional configuration of electric circuits of a smartphone according to an embodiment of the invention.

Figure 2:
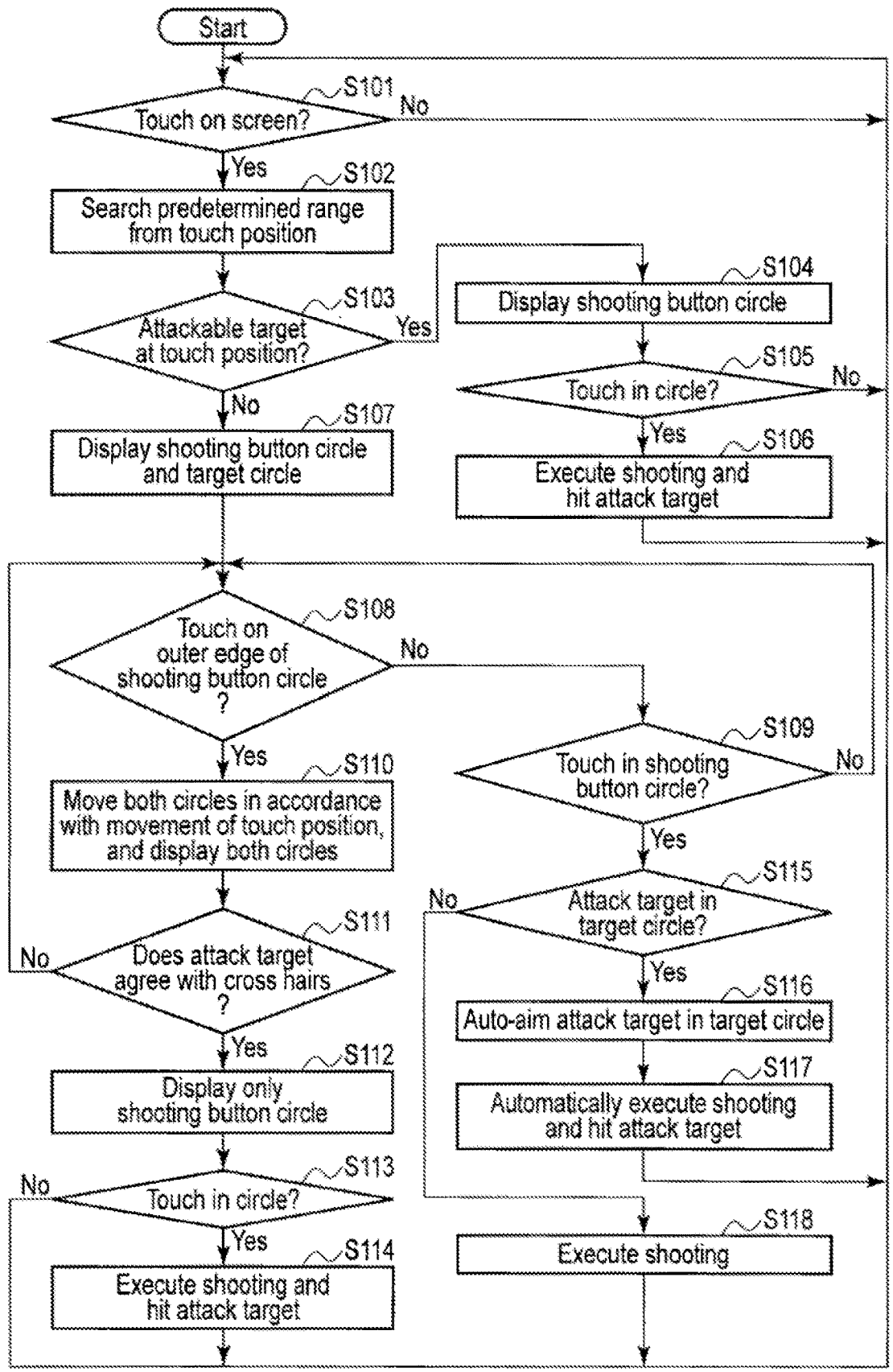

FIG. 2 is a flowchart illustrating the content of a process in association with a touch operation during a shooting game in the embodiment.

FIG. 3 is a view illustrating an image of a part of a shooting button circle which is displayed during the game in the embodiment.

FIG. 4 is a view illustrating an image of a part of a shooting button circle which is displayed during the game in the embodiment.

Figure 5:
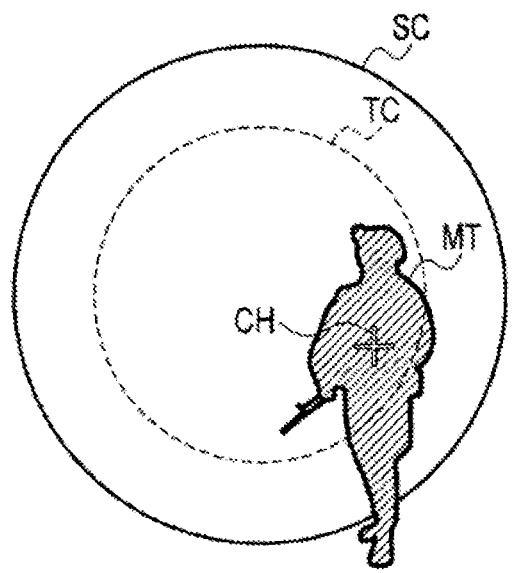

FIG. 5 is a view illustrating an image of a part of a shooting button circle which is displayed during the game in the embodiment.

Figure 6:
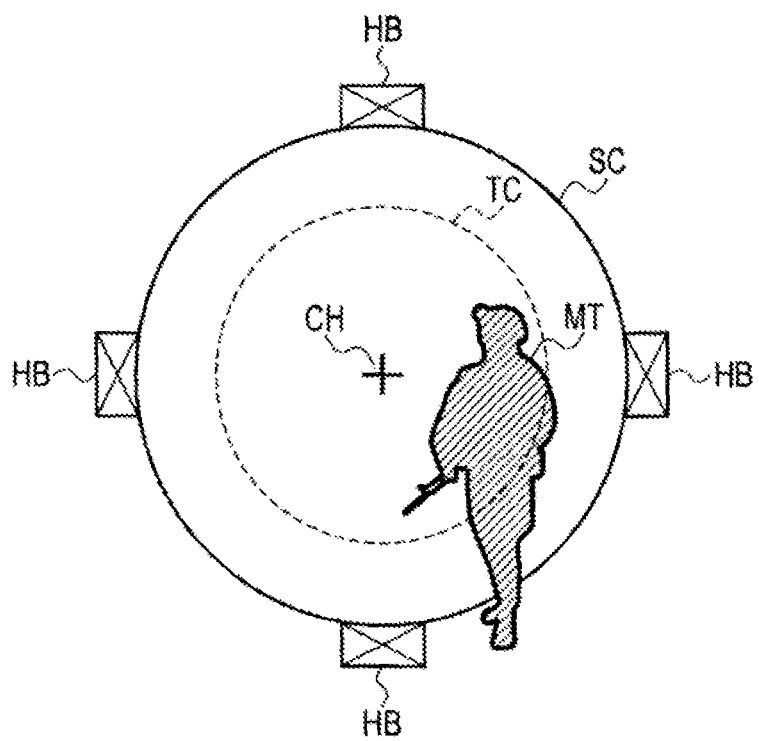

FIG. 6 is a view illustrating an image of a part of a shooting button circle which is displayed during the game in the embodiment.

DETAILED DESCRIPTION OF THE INVENTION

An embodiment in a case where the invention is applied to a shooting game program, which is executed by a smartphone, will now be described with reference to the accompanying drawings.

FIG. 1 is a block diagram illustrating a functional configuration of electronic circuits of a smartphone 10 according to the embodiment. In FIG. 1, a CPU 11 executes a control operation of the entirety of the smartphone 10. A main memory 12, a solid-state drive (SSD) 13, a 3G & 4G communication unit 14, a wireless LAN communication unit 15, an external memory card 16, a display unit 17, a touch panel unit 18, a key input unit 19, an audio processor 20, and an image processor 21 are connected to the CPU 11 via a system bus SB.

The CPU 11 reads out programs (an operating system (OS) and an application program running on the OS) stored in the solid-state drive 13 and fixed pattern data, develops and loads them in the main memory 12, and executes the programs, thereby comprehensively controlling the entire operation of the smartphone 10.

The main memory 12 is composed of, for example, an SRAM, and functions as a work memory of the CPU 11. The solid-state drive 13 is composed of a nonvolatile memory, for instance, a flash memory, and stores, as a storage medium of the smartphone 10, various content data such as image data and song data, as well as the above-described operation programs and various fixed pattern data.

The 3G & 4G communication unit 14 is a communication unit which operates in a dual mode, and transmits/receives data to/from a nearby base station (not shown) via an antenna 22, based on a third-generation mobile communication system according to the IMT-2000 standard, and a fourth-generation mobile communication system according to the IMT-Advance standard.

The wireless LAN communication unit 15 transmits/receives data to/from a nearby access point (not shown) or the like via an antenna 23, based on, for example, the IEEE802.11a/b/g/n standard.

The display unit 17 is composed of a backlight-equipped TFT color liquid crystal panel, and a driving unit thereof. The display unit 17 displays various images.

The touch panel unit 18 is configured to be integral with the display unit 17 by using a transparent electrode. The touch panel unit 18 generates and outputs two-dimensional position coordinate information which corresponds to a touch operation by the user.

The key input unit 19 is composed of some key switches including a power key and a shutter key of a camera function, which are provided on the casing of the smartphone 10, and a driving circuit of these key switches.

The audio processor 20 converts digital audio data, which is delivered via the system bus SB, to an analog audio signal, and outputs the analog audio signal from a speaker 24. In addition, the audio processor 20 samples an analog audio signal, which is input from a microphone 25, converts the analog audio signal to digital data and outputs the digital data.

The image processor 21 converts to digital data an image signal which is output from a solid-state imaging device 27 in accordance with an optical image which is focused on an imaging surface of the solid-state imaging device 27 via an optical lens system 26. The solid-state imaging device 27 is composed of, for example, a CCD (Charge Coupled Device). The image processor 21 creates and outputs file data which is compressed in data amount by a preset file format, for example, by JPEG (Joint Photographic Experts Group) in the case of a still image.

Next, an operation in the embodiment is described.

The operation to be described below is executed after the CPU 11 has read out an application program for a shooting game that is stored in the solid-state drive 13, as described above, and has developed and loaded the application program in the main memory 12. The application program stored in the solid-state drive 13 is not limited to a program which was stored in the solid-state drive 13 at a time of factory shipment of the smartphone 10, and may be a program which is downloaded from the outside by the user of the smartphone 10 via the antenna 22 and 3G & 4G communication unit 14, or the antenna 23 and wireless LAN communication unit 15.

FIG. 2 is a view which extracts and illustrates the content of a process of a shooting action in association with a touch operation on the touch panel unit 18, the process being executed by the CPU 11 in the shooting game with the progress of the game.

At the beginning of the process, the CPU 11 repeatedly determines whether a touch operation by a user has been executed on the touch panel unit 18, thus standing by for a touch operation (step S101).

When a touch operation has been executed, the CPU 11, which has determined this touch operation in step S101, acquires coordinates of the touch-operated position from the touch panel unit 18, searches a predetermined range centering at the touch-operated position in the game image which is being displayed on the display unit 17 at that time. To be more specific, the CPU 11 searches a range which is within a target circle TC (to be described later) and is covered by an auto-aiming function, and searches for an attack target in the course of progress of the game (step S102).

Based on the search result, the CPU 11 determines whether the attack target exists at the touch-operated position and the attack target has been directly designated by the touch operation (step S103).

If it is determined that the attack target exists at the touch-operated position and the attack target has been directly designated by the touch operation, the CPU 11 causes the display unit 17 to display a shooting button circle SC centering at the touch-operated position (step S104).

FIG. 3 is a view illustrating an image of the part of the shooting button circle SC which is displayed on the display unit 17 at this time. As illustrated in FIG. 3, the shooting button circle SC simulates an image of an optical sight (scope) centering at cross hair CH having a cross shape, which is disposed at the touch position. FIG. 3 shows the state in which the central cross hair CH is displayed such that the cross hair CH overlaps a substantially central part of the chest region of an attack target MT.

In this shooting game, it is assumed that the outer frame of the shooting button circle SC functions as an operation element which instructs movement of a shooting position by a slide operation by the user, and the inner part of the shooting button circle SC functions as a button for instructing shooting.

While executing the above-described display, the CPU 11 determines, based on an input from the touch panel unit 18, whether a touch operation has been executed in the shooting button circle SC within a predetermined time period, for example, within two seconds (step S105).

If it is determined that a touch operation has been executed in the shooting button circle SC, the CPU 11 executes shooting at the attack target MT with the progress of the game, and executes a process for an expression by video and audio, and a process for a score, deeming that a bullet hit the attack target MT (step S106). Thereafter, the CPU 11 returns to the process from step S101, in preparation for a touch operation on the next attack target.

In step S105, if no touch operation has been executed in the shooting button circle SC within the predetermined time period, for example, within two seconds, the CPU 11 releases the display of the shooting button circle SC and the cross hair CH shown in FIG. 3, and returns to the process from step S101, in preparation for a touch operation on the next attack target.

In step S103, if it is determined that the attack target does not exist at the position which has been touch-operated by the user and that the attack target has not been directly designated by the touch operation, the CPU 11 causes the touch panel unit 18 to display a shooting button circle SC and a target circle TC which concentrically center at the touch-operated position (step S107).

FIG. 4 is a view illustrating an image of the part of the shooting button circle SC which is displayed on the display unit 17 at this time. As illustrated in FIG. 4, the shooting button circle SC simulates an image of the view field of an optical sight (scope) centering at cross hair CH having a cross shape, which is disposed at the touch position. The concentric target circle TC is displayed inside the shooting button circle SC, for example, by a red broken line (a black broken line in FIG. 4). The target circle TC is representative of a range in which a bullet can hit an attack target by executing shooting by an auto-aiming function.

FIG. 4 illustrates a state in which the attack target MT deviates from the cross hair CH, but a major part of the upper body is within the target circle TC and it is highly possible that shooting is successfully executed by the auto-aiming function and a bullet hits the attack target MT.

The CPU 11 determines, based on an input from the touch panel unit 18, whether an outer edge of the shooting button circle SC has been touch-operated in the state in which the shooting button circle SC, together with the target circle TC, is displayed on the display unit 17 (step S108).

If it is determined that the outer edge of the shooting button circle SC has not been touch-operated, the CPU 11 further determines, based on an input from the touch panel unit 18, whether an inside of the shooting button circle SC has been touch-operated (step S109).

If it is determined that the inside of the shooting button circle SC has not been touch-operated, either, the CPU 11 returns to the process from step S108.

In this manner, by repeatedly executing the process of steps S108 and S109, the CPU 11 stands by for a touch operation on the outer edge or the inside of the shooting button circle SC, while keeping the display state on the display unit 17 as shown in FIG. 4.

In the case where the outer edge of the shooting button circle SC has been touch-operated, if this operation is determined in step S108, the CPU 11 accepts a subsequent slide operation of moving the touch operation while the touch state on the touch panel unit 18 is being kept. Based on the accepted content, the CPU 11 moves the display position of the shooting button circle SC and target circle TC (step S110).

Then, in accordance with this movement, the CPU 11 determines whether the attack target exists at the position of the newly moved cross hair CH and the attack target can directly be shot (step S111).

If it is determined that the attack target does not exist at the position of the moved cross hair CH and the attack target cannot directly be shot, the CPU 11 returns to the process from step S108.

In step S111, if it is determined that the attack target exists at the position of the moved cross hair CH and the attack target can directly be shot, the CPU 11 turns off the display of the target circle TC on the touch panel unit 18, and effects such a display state, as shown in FIG. 3, in which only the shooting button circle SC and cross hair CH are displayed in association with the attack target MT (step S112).

Then, the CPU 11 determines, based on an input from the touch panel unit 18, whether a touch operation has been executed in the shooting button circle SC within a predetermined time period, for example, within two seconds (step S113).

If it is determined that a touch operation has been executed in the shooting button circle SC, the CPU 11 executes shooting at the attack target MT with the progress of the game, and executes a process for an expression by video and audio, and a process for a score, deeming that a bullet hit the attack target MT (step S114). Thereafter, the CPU 11 returns to the process from step S101, in preparation for a touch operation on the next attack target.

In step S113, if no touch operation has been executed in the shooting button circle SC within the predetermined time period, for example, within two seconds, the CPU 11 releases the display of the shooting button circle SC and cross hair CH, and returns to the process from step S101, in preparation for a touch operation on the next attack target.

In the case where a touch operation has been executed in the shooting button circle SC in the state in which the shooting button circle SC and target circle TC are being displayed on the display unit 17, as shown in FIG. 4, if the CPU 11 determines this operation in step S109, the CPU 11 determines whether the attack target MT exists in the target circle TC at this time (step S115).

If it is determined that the attack target MT exists in the target circle TC, the CPU 11 auto-aims at the attack target MT existing in the target circle TC, and causes the position of the cross hair CH to be displayed on the display unit 17 in accordance with the position of the attack target MT (step S116). If there is a plurality of attack targets in the target circle TC, the CPU 11 auto-aims at the attack target MT existing close to the cross hair CH.

FIG. 5 is a view illustrating an image of the part of the shooting button circle SC which is displayed on the display unit 17 at this time. FIG. 5 shows a state in which the cross hair CH are moved away from the center of the target circle TC by the auto-aiming function, so as to locate the position of the attack target MT existing in the shooting button circle SC.

In this manner, at the same time as the cross hair CH is moved to the attack target MT by the auto-aiming function and is displayed, the CPU 11 automatically executes shooting at the attack target MT, and executes a process for an expression by video and audio, and a process for a score, deeming that a bullet hit the attack target MT (step S117).

Thereafter, the CPU 11 returns to the process from step S101, in preparation for a touch operation on the next attack target.

If it is determined in step S115 that the attack target MT does not exist in the target circle TC, there is no attack target, despite shooting having been instructed by the user's touch operation, and the auto-aiming function cannot be executed. Thus, the CPU 11 executes shooting, without moving the position of the cross hair CH, which is displayed on the display unit 17, away from the center of the target circle TC, and executes a process for an expression by video and audio, deeming that shooting was executed in the state in which there was no attack target MT (step S118). Thereafter, the CPU 11 returns to the process from step S101, in preparation for a touch operation on the next attack target.

In the meantime, as illustrated also in FIG. 3 to FIG. 5, while the shooting operation is executed by touch-operating the inside of the shooting button circle SC, the position of the shooting button circle SC can be moved by slide-operating the outer frame of the shooting button circle SC.

Thus, shooting at the attack target MT can easily be executed by slide-operating the shooting button circle SC so that the attack target MT may fall within the target circle TC that is disposed inside the shooting button circle SC, and then executing a touch operation in the shooting button circle SC.

In the case where scores by shooting results on the game are different depending on regions constituting the attack target MT, for instance, a body region, a head region and a leg region of the attack target MT, the outer frame of the shooting button circle SC is slide-operated such that a region with a higher score coincides with the cross hair, within an allowable range of time. Thereby, the user can aim at a higher score. Thus, the capabilities of the game can be enhanced, without varying the simple operability.

In the above-described embodiment, shooting is executed within the shooting button circle SC, and the movement of the shooting button circle SC is executed by slide-operating the outer frame portion of the shooting button circle SC. However, for example, in the smartphone 10 including the display unit 17 with a size of about 4 inches in diagonal, when operating separately the outer frame portion and the inside of the shooting button circle SC, operation to the outer frame portion of the circle that the user intended, likely to be incorrectly detected as an operation of the inside of the shooting button circle SC. In this case, even if the user intended for operation to the outer frame portion of the shooting button circle SC, it is a possible that the shooting button circle SC is not moving, shooting is performed immediately.

Taking this into account, as illustrated in FIG. 6, a plurality of handle buttons HB for a slide operation may be disposed in advance on a periphery of the outer edge portion of the shooting button circle SC, and any one of the handle buttons HB may be slide-operated. Thereby, the movement of the shooting button circle SC may be executed.

Specifically, FIG. 6 illustrates an example in which handle buttons HB are disposed at four locations, i.e. at upper, lower, left and right parts, of the outer periphery of the shooting button circle SC. Even if an outer edge portion of the shooting button circle SC, other than these handle buttons HB, is operated, the movement of the shooting button circle SC is disabled, and an erroneous operation can be avoided.

The number of handle buttons HB, which are disposed, and the positions thereof are not limited to the example illustrated in FIG. 4, and other various modifications may be thinkable.

As has been described above in detail, according to the present embodiment, it is possible to achieve both precise shooting and speedy game development by a simple and easy-to-understand operation, in a device including a touch-panel-type display unit and having a limited display area.

In addition, in the embodiment, the range of shooting is moved by slide-operating the outer edge of the shooting button circle SC which is broader than the target circle TC. Thus, the display range, which becomes a shooting target, is not hidden by the user's fingers, and an operation can be continued while the display range is always being visually recognized.

In the embodiment, shooting is executed by a touch operation in the shooting button circle SC. Thus, the shooting is not executed by greatly moving the finger from a previous operation of moving the shooting button circle SC and then operating a button at another area, and a transition can be made to the operation of executing instant shooting. Therefore, the game with speedier development can be realized.

As illustrated in FIG. 6, in the above embodiment, the handle buttons HB for operating the slide movement of the shooting button circle SC may be provided. Thus, by properly disposing the handle buttons HB where necessary, the useless occurrence of an erroneous operation can surely be avoided.

In the embodiment, both the shooting button circle SC and the target circle TC have circular shapes. However, the invention is not limited to this example. For example, the shape of the shooting button circle SC and the target circle TC may be converted into a rectangular slit-shaped simulating a loophole, and rectangular or other shapes simulating a window. Specifically, the shape of the range capable of shooting and the shape of the range for instructing the execution of the shooting are not limited. Specifically, the shape of the range for instructing the execution of the shooting and shows a range capable of shooting is not limited.

In the above embodiment, the game is executed in a stand-alone mode, based on a game program pre-installed in the smartphone 10. However, the invention is not limited to this example, and the game may be executed as an online game in a state in which the smartphone 10, which functions as a terminal device, is wirelessly connected to a game server apparatus over a network.

In this case, the smartphone 10 displays a game image and executes an input such as a touch operation on the game image. On the other hand, the game server apparatus executes a process of, in particular, determination of success/failure of an attack, and addition of scores at a time of a success.

The present invention is not limited to the above-described embodiments. In practice, various modifications may be made without departing from the spirit of the invention. In addition, the functions executed in the embodiments may be implemented by being properly combined as much as possible. The above-described embodiments include inventions in various stages, and various inventions can be derived from proper combinations of structural elements disclosed herein. For example, even if some structural elements in all the structural elements disclosed in the embodiments are omitted, if the advantageous effect can be obtained, the structure without such structural elements can be derived as an invention.

The invention claimed is:

1. A game control method executed by an apparatus comprising circuitry and a display device, the game control method comprising:
   in response to a first operation from a user on the display device, causing, using the circuitry, a shooting area and a cross hair to be displayed on the display device, the cross hair being positioned inside the shooting area;
   in response to a second operation from the user on the display device, determining, using the circuitry, whether a target exists within a shooting effective range, the shooting effective range being an area inside the shooting area; and
   in response to determining that the target exists within the shooting effective range, performing, using the circuitry, an auto-aiming process to position the cross hair at a position of the target within the shooting effective range, wherein
   when the position of the target within the shooting effective range is off-center from a center of the shooting effective range, the auto-aiming process includes moving the cross hair to be off-center at the position of the target within the shooting effective range.

2. The game control method of claim 1, wherein
   in response to the first operation from the user on the display device, the causing causes the shooting effective range to also be displayed, the shooting area surrounding the shooting effective range, and the cross hair being positioned at or around a center of the shooting area and of the shooting effective range.

3. The game control method of claim 2, wherein
   the second operation corresponds to a touch operation inside the shooting area.

4. The game control method of claim 1, further comprising:
   in response to determining that the target does not exist within the shooting effective range, outputting an indication that no target exists within the shooting effective range.

5. The game control method of claim 1, wherein
   the causing causes the shooting effective range to be displayed at a position corresponding to a position of the first operation.

6. The game control method of claim 1, further comprising:
   in response to determining that the target exists within the shooting effective range and after performing the auto-aiming process to position the cross hair at the position of the target within the shooting effective range, automatically executing a shooting process at the position of the target.

7. The game control method of claim 1, further comprising:
   in response to a slide operation from the user on the display device, moving the shooting area to a position in accordance with the slide operation; and
   in response to a touch operation from the user within the shooting area, executing a shooting process.

8. An apparatus comprising:
   circuitry configured to
      in response to a first operation from a user on a display device, cause a shooting area and a cross hair to be displayed on the display device, the cross hair being positioned inside the shooting area,
      in response to a second operation from the user on the display device, determine whether a target exists within a shooting effective range, the shooting effective range being an area inside the shooting area, and
      in response to determining that the target exists within the shooting effective range, perform an auto-aiming process to position the cross hair at a position of the target within the shooting effective range, wherein
   when the position of the target within the shooting effective range is off-center from a center of the shooting effective range, the auto-aiming process includes moving the cross hair to be off-center at the position of the target within the shooting effective range.

9. The apparatus of claim 8, wherein the circuitry is configured to
   in response to the first operation from the user on the display device, cause the shooting effective range to also be displayed, the shooting area surrounding the shooting effective range, and the cross hair being positioned at or around a center of the shooting area and of the shooting effective range.

10. The apparatus of claim 9, wherein
    the second operation corresponds to a touch operation inside the shooting area.

11. The apparatus of claim 8, wherein the circuitry is configured to
    in response to determining that the target does not exist within the shooting effective range, output an indication that no target exists within the shooting effective range.

12. The apparatus of claim 8, wherein the circuitry is configured to
    cause the shooting effective range to be displayed at a position corresponding to a position of the first operation.

13. The apparatus of claim 8, wherein the circuitry is configured to
    in response to determining that the target exists within the shooting effective range and after performing the auto-aiming process to position the cross hair at the position of the target within the shooting effective range, automatically execute a shooting process at the position of the target.

14. The apparatus of claim 8, wherein the circuitry is configured to
    in response to a slide operation from the user on the display device, move the shooting area to a position in accordance with the slide operation, and
    in response to a touch operation from the user within the shooting area, execute a shooting process.

15. A non-transitory computer-readable medium storing code that, when executed by a computer, controls the computer to perform a method, the method comprising:
    in response to a first operation from a user on a display device, causing a shooting area and a cross hair to be displayed on the display device, the cross hair being positioned inside the shooting area;
    in response to a second operation from the user on the display device, determining whether a target exists within a shooting effective range, the shooting effective range being an area inside the shooting area; and
    in response to determining that the target exists within the shooting effective range, performing an auto-aiming process to position the cross hair at a position of the target within the shooting effective range, wherein
    when the position of the target within the shooting effective range is off-center from a center of the shooting effective range, the auto-aiming process includes moving the cross hair to be off-center at the position of the target within the shooting effective range.

16. The non-transitory computer-readable medium of claim 15, wherein
in response to the first operation from the user on the display device, the causing causes the shooting effective range to also be displayed, the shooting area surrounding the shooting effective range, and the cross hair being positioned at or around a center of the shooting area and of the shooting effective range.

17. The non-transitory computer-readable medium of claim 16, wherein
the second operation corresponds to a touch operation inside the shooting area.

* * * * *